US011677089B2

(12) United States Patent
Choi et al.

(10) Patent No.: US 11,677,089 B2
(45) Date of Patent: Jun. 13, 2023

(54) CATALYST AND METHOD FOR PREPARING THE SAME

(71) Applicant: LG CHEM, LTD., Seoul (KR)

(72) Inventors: Ran Choi, Daejeon (KR); Sang Hoon Kim, Daejeon (KR); Gyo Hyun Hwang, Daejeon (KR); Jun Yeon Cho, Daejeon (KR); Kwanghyun Kim, Daejeon (KR); Wonkyun Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 65 days.

(21) Appl. No.: 17/397,514

(22) Filed: Aug. 9, 2021

(65) Prior Publication Data

US 2021/0399322 A1 Dec. 23, 2021

Related U.S. Application Data

(62) Division of application No. 15/742,390, filed as application No. PCT/KR2017/009322 on Aug. 25, 2017, now Pat. No. 11,121,390.

(30) Foreign Application Priority Data

Nov. 21, 2016 (KR) ........................ 10-2016-0155102

(51) Int. Cl.
*H01M 8/1004* (2016.01)
*B01J 31/16* (2006.01)
(Continued)

(52) U.S. Cl.
CPC ........... *H01M 8/1004* (2013.01); *B01J 31/16* (2013.01); *B01J 37/02* (2013.01); *B01J 37/12* (2013.01);
(Continued)

(58) Field of Classification Search
None
See application file for complete search history.

(56) References Cited

U.S. PATENT DOCUMENTS

2005/0024304 A1* 2/2005 Okuda ................. G09G 3/2025
345/82
2005/0053818 A1* 3/2005 St-Arnaud ............ H01M 8/103
429/493
(Continued)

FOREIGN PATENT DOCUMENTS

CN 1713423 A 12/2005
CN 1774827 A 5/2006
(Continued)

OTHER PUBLICATIONS

Michel et al., "High-Performance Nanostructured Membrane Electrode Assemblies for Fuel Cells Made by Layer-by-Layer Assembly." Advanced Materials, 2007, 19, 3859-3864, Published Online Oct. 31, 2007 (Year: 2007).*
(Continued)

*Primary Examiner* — Amanda J Barrow
(74) *Attorney, Agent, or Firm* — Birch, Stewart, Kolasch & Birch, LLP (57) ABSTRACT

The present specification relates to a carrier-nanoparticle complex, a catalyst including the same, an electrochemical cell or a fuel cell including the catalyst, and a method for preparing the same.

9 Claims, 8 Drawing Sheets

(51) Int. Cl.
  *B01J 37/02* (2006.01)
  *B01J 37/12* (2006.01)
  *H01M 4/90* (2006.01)
  *H01M 4/92* (2006.01)
  *H01M 8/1018* (2016.01)
  *H01M 4/86* (2006.01)
  *H01M 8/10* (2016.01)

(52) U.S. Cl.
  CPC .......... *H01M 4/90* (2013.01); *H01M 4/9008* (2013.01); *H01M 4/9083* (2013.01); *H01M 4/92* (2013.01); *H01M 4/921* (2013.01); *H01M 4/926* (2013.01); *H01M 8/1018* (2013.01); *H01M 2004/8689* (2013.01); *H01M 2008/1095* (2013.01)

(56) References Cited

U.S. PATENT DOCUMENTS

| | | | |
|---|---|---|---|
| 2005/0287418 A1 | 12/2005 | Noh et al. | |
| 2006/0051657 A1 | 3/2006 | Terada et al. | |
| 2006/0275648 A1 | 12/2006 | Kim et al. | |
| 2007/0099069 A1 | 5/2007 | Min et al. | |
| 2007/0117958 A1* | 5/2007 | Mohwald | H01M 8/1025 528/220 |
| 2007/0184972 A1* | 8/2007 | Roev | H01M 4/921 502/182 |
| 2008/0050641 A1* | 2/2008 | Dressick | H01M 4/8807 502/182 |
| 2009/0068544 A1* | 3/2009 | Ragsdale | H01M 8/1037 429/494 |
| 2011/0014550 A1* | 1/2011 | Jiang | H01M 4/8842 429/523 |
| 2011/0082222 A1* | 4/2011 | Ziser | H01M 8/1025 521/38 |
| 2011/0124499 A1 | 5/2011 | Fang et al. | |
| 2012/0009503 A1* | 1/2012 | Haug | H01M 8/1004 429/523 |
| 2012/0100457 A1 | 4/2012 | Ünsal et al. | |
| 2012/0135862 A1 | 5/2012 | Hwang et al. | |
| 2012/0149555 A1 | 6/2012 | Sakamoto et al. | |
| 2015/0024304 A1 | 1/2015 | Nakashima et al. | |
| 2015/0051065 A1* | 2/2015 | Yang | C08J 3/24 502/159 |
| 2015/0086903 A1* | 3/2015 | Yoo | H01M 4/88 429/535 |
| 2015/0255798 A1 | 9/2015 | Shao | |
| 2015/0255802 A1 | 9/2015 | Kim | |
| 2015/0318560 A1* | 11/2015 | Kaneko | H01M 4/8885 502/5 |
| 2017/0312739 A1* | 11/2017 | Cho | B01J 37/16 |
| 2018/0248200 A1* | 8/2018 | Arihara | H01M 4/92 |
| 2018/0375108 A1* | 12/2018 | Cho | B01J 23/38 |
| 2020/0251747 A1* | 8/2020 | Lee | H01M 4/8878 |
| 2020/0328430 A1* | 10/2020 | Cho | B01J 35/023 |

FOREIGN PATENT DOCUMENTS

| | | | | |
|---|---|---|---|---|
| CN | 1983688 A | 6/2007 | | |
| EP | 3 216 521 A1 | 9/2017 | | |
| JP | 6-93114 A | 4/1994 | | |
| JP | 2013-37941 A | 2/2001 | | |
| JP | 2010-182635 | * | 8/2010 | ............. H01M 4/88 |
| JP | 2010-182635 A | 8/2010 | | |
| JP | 2016-143595 A | 8/2016 | | |
| KR | 10-2005-0098818 A | 10/2005 | | |
| KR | 10-2012-0059244 A | 6/2012 | | |
| KR | 10-2016-0007888 | * | 1/2016 | ............. H01M 4/90 |
| KR | 10-2016-0007888 A | 1/2016 | | |
| KR | 10-2016-0052451 A | 5/2016 | | |

OTHER PUBLICATIONS

Berber, et al, "A highly durable fuel cell electrocatalyst based on double-polymer-coated carbon nanotubes," Scientific Reports, 5, 16711 (2015), Published Nov. 23, 2015 (Year: 2015).

Chen et al., "Enhanced Stabllizaton and Deposition of Pt Nanocrystals on Carbon by Dumbbell-like Polyethyleniminated Poly(oxypropylene)diamine", The Journal of Physical Chemistry B, 2006, vol. 110, pp. 9822-9830.

Cui et al., "Octahedral PtNi Nanoparticle Catalysts: Exceptional Oxygen Reduction Activity by Tuning the Alloy Particle Surface Composition", Nano Letters, 2012, vol. 12, pp. 5885-5889.

Extended European Search Report, dated Sep. 24, 2018, for European Application No. 17822536.3.

Geng et al., "In Situ Synthesis and Characterization of Polyethyleimine-Modified Carbon Nanotubes Supported PlRu Electrocatalyst for Methanol Oxidation," J. Nanomaterials, vol. 2015, Published Jan. 19, 2015 (Year: 2015).

Kuo et al., "Multichelate-functionalized carbon nanospheres used for immobilizing Pt catalysts for fuel cells," Journal of Power Sources, 2009, vol. 194, pp. 234-242.

Michel, M., et al, "High-Performance Nanostructured Membrane Electrode Assemblies for Fuel Cells Made by Layer-By-Layer Assembly of Carbon Nanocolloids," Adv. Mater., 2007, vol. 19, pp. 3859-3864.

Product data sheet for NafionTM perfluorinated resin solution product data sheet from Sigma-Aldrich, accessed 412212020. (Year: 2020).

Stamenkovic et al., "Improved Oxygen Reduction Activity on Pt3Ni(111) via Increased Surface Site Availability", Science, 2007, vol. 315, pp. 493-497.

Wang et al., "Phase-transfer interface promoted corrosion from PtNi 10 nanoctahedra to Pt4Ni nanoframes," Nano Research, 2015, 8(1): 140-155, Pubtished Nov. 7, 2014 (Year: 2014).

Zhang, "PEM Fuel Cell Electrocatalysts and Catalyst Layers: Fundamentals and Applications". Springer, 2008, p. 895.

Zhou et al., "Enhancement of Pt and Pt-alloy fuel cell catalyst activity and durability via nitrogen-modified carbon supports", Energy & Environmental Science, 2010, vol. 3, 1437-1446.

* cited by examiner

CATALYST AND METHOD FOR PREPARING THE SAME

The present disclosure is a Divisional of copending application Ser. No. 15/742,390, filed on Jan. 5, 2018, which is the U.S. National Phase of PCT/KR2017/009322 filed Aug. 25, 2017, which claims priority to and the benefits of Korean Patent Application No. 10-2016-0155102, filed with the Korean Intellectual Property Office on Nov. 21, 2016, the entire contents of which are incorporated herein by reference.

TECHNICAL FIELD

The present specification relates to a catalyst including a carrier-nanoparticle complex, an electrochemical cell or a fuel cell including the catalyst, and a method for preparing the same.

BACKGROUND ART

A polymer electrolyte membrane fuel cell (PEMFC) is a most promising alternative energy source due to its high energy density, low operating temperature, and environmental-friendly products. As a fuel cell catalyst, platinum (Pt) is known to be most superior, however, high price and instability of platinum are factors inhibiting PEMFC commercialization. Moreover, a slow oxygen reduction reaction in a cathode reduces fuel cell efficiency.

In view of the above, studies on preparing an alloy catalyst made of platinum and inexpensive transition metals, and increasing activity for an oxygen reduction reaction by controlling the catalyst active surface through controlling the shape have been ongoing.

A colloidal synthesis method most commonly used in the art synthesizing such catalysts has an advantage in readily controlling catalyst particle sizes and shapes, but has a disadvantage in that activity decreases by catalyst reaction sites being blocked due to a surfactant adsorbed on the particle surface, and electron migration between a catalyst and a support is difficult.

A one-pot synthesis method introducing a metal precursor and a carrier at once to synthesize a catalyst has been much reported to compensate this problem. A one-pot synthesis method is simpler than the above-mentioned method progressed in two steps, and catalysts synthesized using the one-pot synthesis method are known to have an increased surface area of particles capable of participating in the reaction since there are no surfactants adsorbed on the surface. However, there is a disadvantage in that particle shapes are difficult to control.

Accordingly, studies on preparation methods more readily controlling particle shapes without a surfactant have been required.

DISCLOSURE

Technical Problem

The present specification is directed to providing a catalyst including a carrier-nanoparticle complex, an electrochemical cell or a fuel cell including the catalyst, and a method for preparing the same.

Technical Solution

One embodiment of the present specification provides a method for preparing a catalyst for a fuel cell including forming a polymer layer having an amine group and a hydrogen ion exchange group represented by the following Chemical Formula 12 on a carbon carrier; preparing a reaction composition by adding the polymer layer-formed carbon carrier, a first metal precursor, a second metal precursor and a capping agent having a carboxyl group to a solvent, and, using the reaction composition, preparing a carrier-nanoparticle complex having metal nanoparticles formed on the polymer layer of the carbon carrier; and acid treating the complex.

[Chemical Formula 12]

In Chemical Formula 12, X is a monovalent cation group.

Another embodiment of the present specification provides a catalyst for a fuel cell including a carrier-nanoparticle complex comprising a carbon carrier; a polymer layer provided on a surface of the carbon carrier and having an amine group and a hydrogen ion exchange group represented by the following Chemical Formula 12; and metal nanoparticles provided on the polymer layer and having an octahedron structure, wherein the metal nanoparticles includes a first metal and a second metal, the first metal and the second metal are different from each other, and a molar ratio of the first metal and the second metal is from 0.8:0.2 to 0.9:0.1.

[Chemical Formula 12]

In Chemical Formula 12, X is a monovalent cation group.

Still another embodiment of the present specification provides a membrane electrode assembly including an anode catalyst layer, a cathode catalyst layer, and a polymer electrolyte membrane provided between the anode catalyst layer and the cathode catalyst layer, wherein the cathode catalyst layer includes the catalyst.

Yet another embodiment of the present specification provides a fuel cell including the membrane electrode assembly.

Advantageous Effects

A catalyst prepared according to a method for preparing a carrier-octahedron structured metal nanoparticle complex according to one embodiment of the present specification has an advantage of being suitable as a catalyst for a fuel cell reduction electrode with a (111) surface having high activity for an oxygen reduction reaction.

A catalyst prepared according to a method for preparing a carrier-octahedron structured metal nanoparticle complex according to one embodiment of the present specification increases a degree of dispersion of alloy particles by an amine group and a hydrogen transfer ion layer treated on a carrier, and therefore, is capable of increasing a catalyst utilization rate of an electrode layer when driving a fuel cell.

A catalyst prepared according to a method for preparing a carrier-octahedron structured metal nanoparticle complex according to one embodiment of the present specification increases a degree of dispersion of alloy particles by an amine group and a hydrogen transfer ion layer treated on a carrier, and therefore, is effective in enhancing fuel cell performance through lowering hydrogen transfer resistance by the hydrogen transfer ion layer.

A method for preparing a carrier-nanoparticle complex according to one embodiment of the present specification synthesizes a complex in a one-pot synthesis without toxic materials such as DMF or CO gas, and is effective in synthesizing a complex having uniform distribution while controlling a shape through an environmental-friendly and simple process.

REFERENCE NUMERAL

10: Electrolyte Membrane
20, 21: Catalyst Layer
40, 41: Gas Diffusion Layer
50: Cathode
51: Anode
60: Stack
70: Oxidizer Supply Unit
80: Fuel Supply Unit
81: Fuel Tank
82: Pump

MODE FOR DISCLOSURE

Hereinafter, the present specification will be described in detail.

The present specification provides a catalyst for a fuel cell including a carrier-nanoparticle complex comprising a carbon carrier; a polymer layer provided on a surface of the carbon carrier and having an amine group and a hydrogen ion exchange group represented by the following Chemical Formula 12; and metal nanoparticles provided on the polymer layer and having an octahedron structure.

[Chemical Formula 12]

In Chemical Formula 12, X is a monovalent cation group.

The carbon carrier may include one or more types selected from the group consisting of carbon black, carbon nanotubes (CNT), graphite, graphene, active carbon, mesoporous carbon, carbon fiber and carbon nano wire.

The polymer layer may be provided on a part or the whole of the carbon carrier surface. The polymer layer may be provided on greater than or equal to 50% and less than or equal to 100% of the carbon carrier surface, and specifically, the polymer layer may be provided on greater than or equal to 75% and less than or equal to 100%.

Based on the total elements on the polymer layer surface, the content of the nitrogen element of the amine group may be greater than or equal to 0.01% by weight and less than or equal to 5% by weight, and the content of the sulfur element of the hydrogen ion exchange group of Chemical Formula 12 may be greater than or equal to 0.01% by weight and less than or equal to 1% by weight. When the sulfur element content is greater than 1% by weight, the carrier surface becomes too hydrophilic causing an adverse effect in water discharge in a cell.

The polymer layer may either include polyalkyleneimine having an amine group and a hydrogen ion exchange polymer having the hydrogen ion exchange group, or include a polymer derived from polyalkyleneimine having an amine group and a hydrogen ion exchange polymer having the hydrogen ion exchange group.

The polyalkyleneimine (PEI) and the hydrogen ion exchange polymer (ionomer) may have a weight ratio (PEI/ionomer) of greater than or equal to 15 and less than or equal to 100.

The polyalkyleneimine may be a polymer having an aliphatic hydrocarbon main chain and including at least 10 or more amine groups in the main chain and the side chain. The amine group herein includes a primary amine group, a secondary amine group, a tertiary amine group and a quaternary amine group, and the amine group included in the main chain and the side chain of the polyalkyleneimine may have 10 or more of at least one of a primary amine group, a secondary amine group, a tertiary amine group and a quaternary amine group.

The polyalkyleneimine may have a weight average molecular weight of greater than or equal to 500 and less than or equal to 1,000,000.

The polyalkyleneimine may include at least one of a repeating unit represented by the following Chemical Formula 1 and a repeating unit represented by the following Chemical Formula 2.

[Chemical Formula 1]

[Chemical Formula 2]

In Chemical Formulae 1 and 2, E1 and E2 are each independently an alkylene group having 2 to 10 carbon atoms, R is a substituent represented by any one of the following Chemical Formulae 3 to 5, and o and p are each an integer of 1 to 1000,

[Chemical Formula 3]

[Chemical Formula 4]

in Chemical Formulae 3 to 5, A1 to A3 are each independently an alkylene group having 2 to 10 carbon atoms, and R1 to R3 are each independently a substituent represented by any one the following Chemical Formulae 6 to 8, in Chemical Formulae 6 to 8, A4 to A6 are each independently an alkylene group having 2 to 10 carbon atoms, and R4 to R6 are each independently a substituent represented by the following Chemical Formula 9, and in Chemical Formula 9, A7 is an alkylene group having 2 to 10 carbon atoms.

The polyalkyleneimine may include at least one of a compound represented by the following Chemical Formula 10 and a compound represented by the following Chemical Formula 11.

In Chemical Formulae 10 and 11, X1, X2, Y1, Y2 and Y3 are each independently an alkylene group having 2 to 10 carbon atoms, R is a substituent represented by any one of the following Chemical Formulae 3 to 5, q is an integer of 1 to 1000, n and m are each an integer of 1 to 5, and l is an integer of 1 to 200, in Chemical Formulae 3 to 5, A1 to A3 are each independently an alkylene group having 2 to 10 carbon atoms, and R1 to R3 are each independently a substituent represented by any one of the following Chemical Formulae 6 to 8, in Chemical Formulae 6 to 8, A4 to A6 are each independently an alkylene group having 2 to 10 carbon atoms, and R4 to R6 are each independently a substituent represented by the following Chemical Formula 9, and in Chemical Formula 9, A7 is an alkylene group having 2 to 10 carbon atoms.

In the present specification, means a substitution position of a substituent.

In the present specification, the alkylene group may be linear or branched, and, although not particularly limited thereto, the number of carbon atoms is preferably from 2 to 10. Specific examples thereof may include an ethylene group, a propylene group, an isopropylene group, a butylene group, a t-butylene group, a pentylene group, a hexylene group, a heptylene group and the like, but are not limited thereto.

The hydrogen ion exchange polymer includes a hydrogen ion exchange group represented by the following Chemical Formula 12.

[Chemical Formula 12]

In Chemical Formula 12, X is a monovalent cation group.

Protons are readily transferred to the metal nanoparticles bonding to the amine group on the polymer layer through the hydrogen ion exchange group, and therefore, a utilization rate of the metal nanoparticles may increase.

Figure 4:
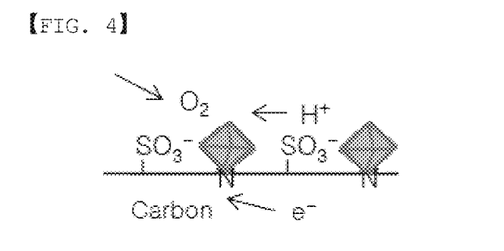
FIG. 4 is a mimetic diagram of a reaction on a surface of a carrier-nanoparticle complex in one embodiment of the present specification.

As shown in FIG. 4, the amine group on the polymer layer surface and the octahedron-structured metal nanoparticles bond to each other, and $H^+$ is transferred to the metal nanoparticles, an active metal site, through the hydrogen ion exchange group of the polymer layer present on the carbon carrier surface, and therefore, the metal nanoparticles are readily used.

The hydrogen ion exchange polymer is not particularly limited as long as it includes the hydrogen ion exchange group represented by Chemical Formula 12, and those generally used in the art may be used.

The hydrogen ion exchange polymer may be a hydrocarbon-based polymer, a partial fluorine-based polymer or a fluorine-based polymer. The hydrocarbon-based polymer may be a hydrocarbon-based sulfonated polymer without a fluorine group, and on the contrary, the fluorine-based polymer may be a sulfonated polymer saturated with a fluorine group, and the partial fluorine-based polymer may be a sulfonated polymer that is not saturated with a fluorine group.

The hydrogen ion exchange polymer may be one, two or more polymers selected from the group consisting of a perfluorosulfonic acid-based polymer, a hydrocarbon-based polymer, an aromatic sulfone-based polymer, an aromatic ketone-based polymer, a polybenzimidazole-based polymer, a polystyrene-based polymer, a polyester-based polymer, a polyimide-based polymer, a polyvinylidene fluoride-based polymer, a polyethersulfone-based polymer, a polyphenylene sulfide-based polymer, a polyphenylene oxide-based polymer, a polyphosphazene-based polymer, a polyethylene naphthalate-based polymer, a polyester-based polymer, a doped polybenzimidazole-based polymer, a polyetherketone polymer, a polyphenylquinoxaline-based polymer, a polysulfone-based polymer, a polypyrrole-based polymer and a polyaniline-based polymer. The polymer may be a single copolymer, an alternating copolymer, a random copolymer, a block copolymer, a multi-block copolymer or a graft copolymer, but is not limited thereto.

Examples of the hydrogen ion exchange polymer may include at least one of Nafion, sulfonated polyetheretherketone (sPEEK) sulfonated (polyetherketone) (sPEK), poly(vinylidene fluoride)-graft-polystyrene sulfonic acid (PVDF-g-PSSA) and sulfonated poly(fluorenyl ether ketone).

When the amine group of the polyalkyleneimine and the hydrogen ion exchange group of the hydrogen ion exchange polymer are adjacent to each other, they may bond to form a sulfonamide bonding structure (—SO$_2$—NH—) through a chemical reaction.

The polymer layer may include a polymer crosslinked to each other through a crosslinking agent capable of each reacting with each of the amine group of the polyalkyleneimine and the hydrogen ion exchange group of the hydrogen ion exchange polymer.

The crosslinking agent is not particularly limited as long as it is capable of crosslinking the amine group of the polyalkyleneimine and the hydrogen ion exchange group of the hydrogen ion exchange polymer, and examples thereof may include POCl$_3$ and the like.

As in the following Reaction Formula 1, the polymer layer may include a polymer in which a sulfonamide bonding structure (—SO$_2$—NH—) is formed by the hydrogen ion exchange group of the hydrogen ion exchange polymer (P1-SO$_3$H) and the amine group of the polyalkyleneimine (P2-NH$_2$) being crosslinked to each other by POCl$_3$, a crosslinking agent.

[Reaction Formula 1]

In the reaction formula, P1 is a hydrogen ion exchange polymer excluding —SO$_3$H, the hydrogen ion exchange group, and P2 is polyalkyleneimine excluding —NH$_2$ in the amine group.

The metal nanoparticles may bond to the amine group of the polymer layer, and specifically, may bond to the amine group of the polyalkyleneimine.

The metal nanoparticles include a first metal and a second metal, the first metal and the second metal are different from each other, and the first metal and the second metal may have a molar ratio of 0.8:0.2 to 0.9:0.1.

The first metal may include at least one of platinum (Pt), palladium (Pd), rhodium (Rh), iridium (Ir) and ruthenium (Ru), and is preferably formed with platinum.

The second metal may include at least one of nickel (Ni), osmium (Os), cobalt (Co), iron (Fe) and copper (Cu), and preferably includes nickel.

The metal nanoparticles may have an average particle diameter of greater than or equal to 2 nm and less than or equal to 20 nm, and specifically, greater than or equal to 3 nm and less than or equal to 10 nm. This has an advantage in that catalyst efficiency is high since the metal nanoparticles are well-dispersed on the carbon carrier without aggregation. Herein, the average particle diameter of the metal nanoparticles means an average of the length of the longest line among the lines connecting two points on the metal nanoparticle surface.

The metal nanoparticles are octahedron structured particles having a (111) surface. Particles having an octahedron shape with a (111) surface has excellent activity for an oxygen reduction reaction. Specifically, the octahedron structured particles having a (111) surface may be Pt$_x$Ni$_{1-x}$ particles.

With respect to the total weight of the carrier-nanoparticle complex, the metal nanoparticle content may be greater than or equal to 15% by weight and less than or equal to 50% by weight. Specifically, with respect to the total weight of the carrier-nanoparticle complex, the metal nanoparticle content may be greater than or equal to 20% by weight and less than or equal to 40% by weight.

The present specification provides an electrochemical cell including the catalyst.

The electrochemical cell means a battery using a chemical reaction, and the type is not particularly limited as long as it is provided with a polymer electrolyte membrane, and for example, the electrochemical cell may be a fuel cell, a metal secondary battery or a flow battery.

The present specification provides an electrochemical cell module including the electrochemical cell as a unit cell.

The electrochemical cell module may be formed by inserting a bipolar plate between the flow batteries according to one embodiment of the present application, and stacking the result.

The cell module may specifically be used as a power source of electric vehicles, hybrid electric vehicles, plug-in hybrid electric vehicles or power storage systems.

The present specification provides a membrane electrode assembly including an anode catalyst layer, a cathode catalyst layer and a polymer electrolyte membrane provided between the anode catalyst layer and the cathode catalyst layer, wherein the cathode catalyst layer includes the catalyst.

The membrane electrode assembly may further include an anode gas diffusion layer provided on a surface opposite to the surface of the anode catalyst layer provided with the polymer electrolyte membrane, and a cathode gas diffusion layer provided on a surface opposite to the surface of the cathode catalyst layer provided with the polymer electrolyte membrane.

The present specification provides a fuel cell including the membrane electrode assembly.

Figure 1:
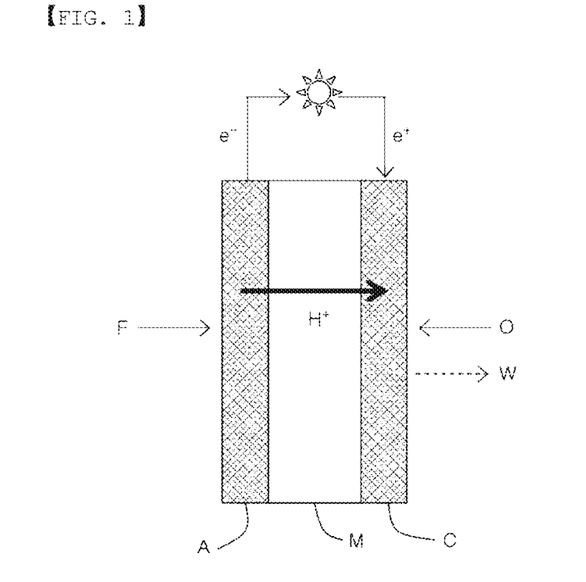
FIG. 1 is a schematic diagram showing a principle of electricity generation of a fuel cell.

FIG. 1 is a diagram schematically showing a principle of electricity generation of a fuel cell, and a most basic unit generating electricity in a fuel cell is a membrane electrode assembly (MEA), which is formed with an electrolyte membrane (M), and an anode (A) and a cathode (C) formed on both surfaces of this electrolyte membrane (M). When referring to FIG. 1 showing a principle of electricity generation of a fuel cell, an oxidation reaction of fuel (F) such as hydrogen, methanol or hydrocarbon such as butane occurs in an anode (A) to generate hydrogen ions ($H^+$) and electrons ($e^-$), and the hydrogen ions migrate to a cathode (C) through an electrolyte membrane (M). In the cathode (C), the hydrogen ions transferred through the electrolyte membrane (M), an oxidizer (O) such as oxygen, and electrons react to produce water (W). Through such a reaction, electrons migrate to an external circuit.

Figure 2:
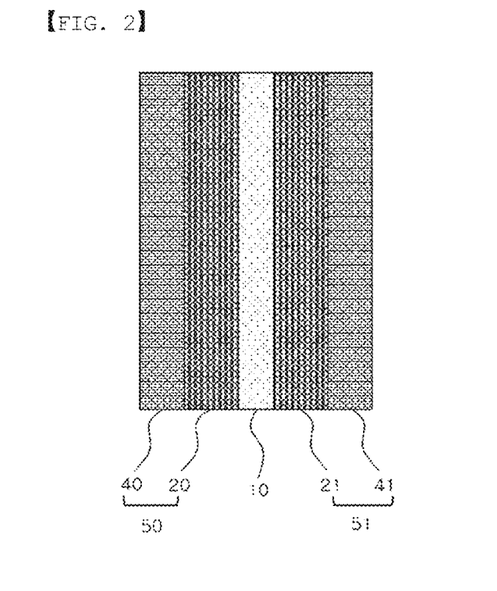
FIG. 2 is a diagram schematically illustrating a structure of a membrane electrode assembly for a fuel cell.

FIG. 2 schematically illustrating a structure of a membrane electrode assembly for a fuel cell, and the membrane electrode assembly for a fuel cell may be provided with an electrolyte membrane (10), and a cathode (50) and an anode (51) placed opposite to each other with this electrolyte membrane (10) in between. The cathode may be provided with a cathode catalyst layer (20) and a cathode gas diffusion layer (40) consecutively from the electrolyte membrane (10), and the anode may be provided with an anode catalyst layer (21) and an anode gas diffusion layer (41) consecutively from the electrolyte membrane (10).

In the membrane electrode assembly, the catalyst according to the present specification may be included in at least one of the cathode catalyst layer and the anode catalyst layer.

Figure 3:
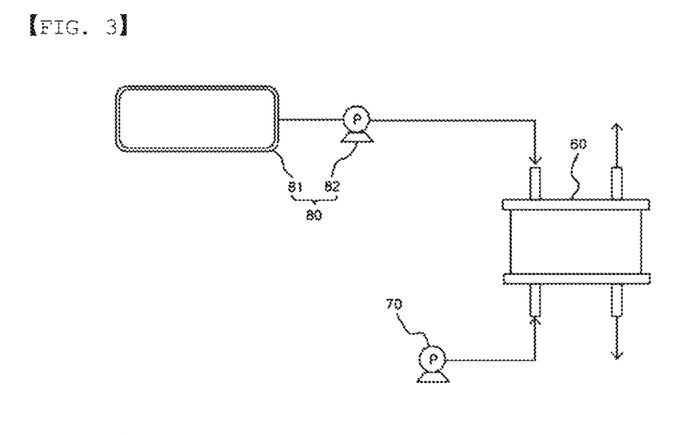
FIG. 3 is a diagram schematically illustrating one example of a fuel cell.

FIG. 3 schematically illustrating a structure of a fuel cell, and the fuel cell is formed including a stack (60), an oxidizer supply unit (70) and a fuel supply unit (80).

The stack (60) includes one, two or more of the membrane-electrode assemblies described above, and when two or more of the membrane-electrode assemblies are included, a separator provided therebetween is included. The separator prevents the membrane-electrode assemblies from being electrically connected, and performs a role of transferring fuel and oxidizer supplied from the outside to the membrane-electrode assemblies.

The oxidizer supply unit (70) performs a role of supplying an oxidizer to the stack (60). As the oxidizer, oxygen is typically used, and oxygen or air may be injected to the oxidizer supply unit (70).

The fuel supplying unit (80) performs a role of supplying fuel to the stack (60), and may be formed with a fuel tank (81) storing fuel, and a pump (82) supplying the fuel stored in the fuel tank (81) to the stack (60). As the fuel, hydrogen or hydrocarbon fuel in a gas or liquid state may be used. Examples of the hydrocarbon fuel may include methanol, ethanol, propanol, butanol or natural gas.

The cathode catalyst layer may include the carrier-nanoparticle complex according to the present specification as a catalyst.

The anode catalyst layer and the cathode catalyst layer may each include an ionomer.

When the cathode catalyst layer includes the carrier-nanoparticle complex, a ratio of the ionomer and the carrier-nanoparticle complex (ionomer/complex, I/C) of the cathode catalyst layer is from 0.3 to 0.7.

Considering that a general I/C ratio used in commercial catalysts is from 0.8 to 1 (stated in a book "PEM fuel cell Electrocatalyst and catalyst layer", page 895), the ionomer content required for the catalyst layer may be reduced by 20% by weight or greater, specifically may be reduced by 30% by weight or greater, and more specifically may be reduced by 50% by weight or greater when including the carrier-nanoparticle complex according to the present specification as a catalyst. In other words, there is an advantage in that the content of the expensive ionomer may be reduced, and hydrogen ion conductivity is maintained at a certain level or higher even with a low ionomer content.

The ionomer performs a role of providing a passage for ions generated from the reaction between fuel such as hydrogen or methanol and a catalyst to migrate to the electrolyte membrane.

As the ionomer, polymers having a cation exchange group selected from the group consisting of a sulfonic acid group, a carboxylic acid group, a phosphoric acid group, a phosphonic acid group and derivatives thereof on the side chain may be used. Specifically, the ionomer may include one or more types of hydrogen ion conductive polymers selected from among fluoro-based polymers, benzimidazole-based polymers, polyimide-based polymers, polyetherimide-based polymers, polyphenylene sulfide-based polymers, polysulfone-based polymers, polyethersulfone-based polymers, polyetherketone-based polymers, polyether-etherketone-based polymers or polyphenylquinoxaline-based polymers. Specifically, according to one embodiment of the present specification, the polymer ionomer may be Nafion.

The present specification provides a method for preparing a catalyst for a fuel cell including forming a polymer layer having an amine group and a hydrogen ion exchange group represented by the following Chemical Formula 12 on a carbon carrier; preparing a reaction composition by adding the polymer layer-formed carbon carrier, a first metal precursor, a second metal precursor and a capping agent having a carboxyl group to a solvent, and, using the reaction composition, preparing a complex having metal nanoparticles formed on the polymer layer of the carbon carrier; and acid treating the complex.

[Chemical Formula 12]

In Chemical Formula 12, X is a monovalent cation group.

The method for preparing a catalyst for a fuel cell may cite the descriptions on the catalyst including a carrier-nanoparticle complex.

The method for preparing a catalyst for a fuel cell includes forming a polymer layer having an amine group and a hydrogen ion exchange group represented by Chemical Formula 12 on a carbon carrier.

The forming of a polymer layer may be forming a polymer layer by introducing a carbon carrier to a solution including polyalkyleneimine and a hydrogen ion exchange polymer, or a solution including a polymer derived from polyalkyleneimine having an amine group and a hydrogen ion exchange polymer having the hydrogen ion exchange group.

The method for preparing a catalyst for a fuel cell may include preparing a first solution by adding a carbon carrier, polyalkyleneimine and a hydrogen ion exchange polymer to a solvent; and stirring the first solution.

The first solution may further include a crosslinking agent. The crosslinking agent may have reacting groups that may react with each of the amine group of the polyalkyleneimine and the hydrogen ion exchange group of the hydrogen ion exchange polymer.

The method for preparing a catalyst for a fuel cell may include preparing a solution by adding a carbon carrier, and a polymer derived from polyalkyleneimine and a hydrogen ion exchange polymer having the hydrogen ion exchange group to a solvent; and stirring the solution.

The solvent of the solution is not particularly limited, but may include at least one of water, ethanol, 2-propanol and iso-propanol.

Based on the solid weight of the solution, the carbon carrier content may be greater than or equal to 14% by weight and less than or equal to 30% by weight.

Based on the solid weight of the solution, the polyalkyleneimine content may be greater than or equal to 65% by weight and less than or equal to 85% by weight.

Based on the solid weight of the solution, the hydrogen ion exchange polymer content may be greater than or equal to 0.1% by weight and less than or equal to 5% by weight.

When the solvent further includes a crosslinking agent, the crosslinking agent content may be greater than 0% by weight and less than or equal to 3% by weight based on the solid weight of the solution.

When the solvent includes a carbon carrier, and a polymer derived from polyalkyleneimine and a hydrogen ion exchange polymer having the hydrogen ion exchange group, the content of the carbon carrier may be greater than or equal to 14% by weight and less than or equal to 30% by weight, and the content of the polymer derived from polyalkyleneimine and a hydrogen ion exchange polymer having the hydrogen ion exchange group may be greater than or equal to 70% by weight and less than or equal to 86% by weight, based on the solid weight of the solution.

Based on the total weight of the solution, the total solid content of the solution excluding the solvent may be greater than or equal to 0.3% by weight and less than or equal to 20% by weight, and based on the total weight of the solution, the solvent content may be greater than or equal to 80% by weight and less than or equal to 99.7% by weight.

The time of stirring the solution may be longer than or equal to 3 hours and shorter than or equal to 72 hours.

The method for preparing a catalyst for a fuel cell includes preparing a reaction composition by adding the polymer layer-formed carbon carrier, a first metal precursor, a second metal precursor and a capping agent having a carboxyl group to a solvent, and, using the reaction composition, preparing a complex having metal nanoparticles formed on the polymer layer of the carbon carrier.

The preparing of a complex having metal nanoparticles formed on the polymer layer of the carbon carrier may include preparing a reaction composition by adding the polymer layer-formed carbon carrier, a first metal precursor, a second metal precursor and a capping agent having a carboxyl group to a solvent; and, using the reaction composition, preparing a complex having metal nanoparticles formed on the polymer layer of the carbon carrier.

The preparing of a complex having metal nanoparticles formed on the polymer layer of the carbon carrier may include dissolving the first metal precursor and the second metal precursor by heating the reaction composition to a temperature of 120° C. or lower; reacting the result by raising the temperature to 200° C. to 230° C.; cooling the result to room temperature; and filtering the reaction composition completed with the reaction to obtain a complex having metal nanoparticles formed on the polymer layer of the carbon carrier.

The preparing of a reaction composition may include dispersing the carbon carrier into a solvent by adding the polymer layer-formed carbon carrier to the solvent; and preparing a reaction composition by adding a first metal precursor, a second metal precursor and a capping agent having a carboxyl group thereto.

The capping agent having a carboxyl group may include citric acid or a mixture of citric acid and sodium formate.

The capping agent having a carboxyl group provides help in enhancing uniformity of metal particle sizes, and forming an octahedron structure. Specifically, adding citric acid provides help with metal precursor dissolution as the pH of the reaction composition changes to an acidic condition, and as a result, particle size uniformity and the degree of dispersion may be enhanced.

Based on the total weight of the reaction composition, the content of the capping agent having a carboxyl group may be greater than or equal to 0.1% by weight and less than or equal to 2% by weight.

Based on the total weight of the reaction composition, the content of the polymer layer-formed carbon carrier may be greater than or equal to 0.1% by weight and less than or equal to 3% by weight.

The metal precursor is a material before being reduced to metal nanoparticles, and is formed with metal ions and ligands. The metal precursor is divided depending on the types of the metal ion and the ligand.

The ligand of the first metal precursor may be at least one of acetylacetonate and acetate, and specifically, may be acetylacetonate.

The first metal precursor may include at least one of platinum(II) acetylacetonate ($Pt(acac)_2$), palladium acetylacetonate ($Pd(acac)_2$), palladium acetate ($Pd(OAc)_2$), rhodium acetylacetonate ($Rh(acac)_2$), iridium acetylacetonate ($Ir(acac)_2$) and ruthenium acetylacetonate ($Ru(acac)_2$). The first metal precursor preferably includes platinum acetylacetonate.

The ligand of the second metal precursor may include at least one of acetylacetonate, formate dihydrate, acetate tetrahydrate, formate hydrate, acetate and formate, and specifically, may be acetylacetonate.

The second metal precursor may include one of nickel(II) acetylacetonate, nickel(II) formate dihydrate, nickel(II) acetate tetrahydrate, copper(II) acetylacetonate, copper(II) formate hydrate, copper(II) acetate, cobalt(II) acetylacetonate, cobalt(II) acetate tetrahydrate, cobalt(II) formate, iron (II) acetylacetonate and iron(II) acetate. The second metal precursor preferably includes nickel acetylacetonate.

Based on the total weight of the reaction composition, the total content of the first metal precursor may be greater than or equal to 0.1% by weight and less than or equal to 4% by weight.

Based on the total weight of the reaction composition, the total content of the second metal precursor may be greater than or equal to 0.03% by weight and less than or equal to 12% by weight.

Based on the total weight of the reaction composition, the solvent content may be greater than or equal to 87% by weight and less than or equal to 99% by weight.

The pH of the reaction composition may be 4 or less, and specifically, higher than or equal to 1 and lower than or equal to 4. $Pt(acac)_2$ is not soluble in polar solvents but is soluble under a diluted acidic condition, and the reaction composition having an acidic pH provides help with precursor dissolution and has an advantage of increasing particle size uniformity when forming particles.

The solvent of the reaction composition may include polyalcohol having two or more hydroxyl groups. The polyalcohol is not particularly limited as long as it has two or more hydroxyl groups, but may include at least one of ethylene glycol, diethylene glycol and propylene glycol.

The reaction composition does not include a surfactant. This has an advantage in that a step of removing a surfactant after synthesizing a catalyst is not required, and there are no active site decreases caused by a surfactant.

The method for preparing a catalyst for a fuel cell includes acid treating the complex having metal nanoparticles formed on the polymer layer of the carbon carrier.

The concentration of the acid treatment solution of the acid treatment may be 2 M or less, and specifically, the acid concentration may be greater than or equal to 0.5 M and less than or equal to 2 M.

The acid treatment time of the acid treatment may be longer or equal to 1 hour and shorter than or equal to 5 hours.

The acid treatment temperature of the acid treatment may be higher than or equal to 50° C. and lower than or equal to 90° C.

The acid used in the acid treatment may be at least one of sulfuric acid, nitric acid, hydrochloric acid and mixtures thereof, and sulfuric acid may be used as the acid used in the acid treatment.

Through the acid treatment, some of the transition metals present on the surfaces of the metal nanoparticles on the polymer layer of the carbon carrier may be removed.

When Ni—Pt particles are formed on the polymer layer of the carbon carrier, some of the Ni present on the Ni—Pt particle surfaces may be removed through the acid treatment.

The method for preparing a catalyst for a fuel cell may further include, after the forming of metal nanoparticles on the polymer layer of the carbon carrier and before the acid treatment, washing the complex having metal nanoparticles formed on the polymer layer of the carbon carrier and removing the solvent.

In the removing of the solvent, the solvent is removed and then the metal nanoparticles provided on the polymer layer of the carbon carrier may be sintered.

The removing of the solvent may be heat treatment under hydrogen or argon atmosphere. Herein, the heat treatment temperature may be higher than or equal to 200° C. and lower than or equal to 300° C. The solvent may not be completely removed at lower than 200° C., and the octahedron structure shape may be deformed at higher than 300° C.

According to a recent report of a non-patent document (Vojislav R. Stamenkovicl, Ben Fowler, Bongjin Simon Mun, Guofeng Wang, Philip N. Ross, Christopher A. Lucas, Nenad M. Markovic, Science 315 493-497 (2007)), the (111) surface of $Pt_xNi_{1-x}$ particles has excellent activity for an oxygen reduction reaction.

Accordingly, an octahedron structured PtNi particles may be synthesized using a surfactant, or dimethyl formamide (DMF) or CO gas (stated in Chunhua Cui, Lin Gan, Hui-Hui Li, Shu-Hong Yu, Marc Heggen, Peter Strasser Nano Lett. 12, 58855889 (2012)). However, using a surfactant inhibits active sites and has a limit of performance decline in an actual unit cell. In addition, DMF and CO gas are toxic materials and have limits in mass production for commercializing a catalyst.

As a result of extensive studies in view of the above, the inventors of the present disclosure have identified that, when synthesizing a catalyst on a specific functional group-treated carrier using a specific method, a platinum-nickel alloy catalyst having a specific surface may be synthesized, and this catalyst exhibits equal or higher performance with half (½) of platinum compared to existing commercialized platinum catalysts by enhancing high dispersion support of particles and a hydrogen transfer section of a membrane electrode assembly due to an effect of the functional group that the carrier has while maximizing activity for an oxygen reduction reaction for the specific surface, and have completed the present disclosure.

Meanwhile, the method of the present specification has an advantage in that a catalyst having octahedron structured metal particles including a (111) surface may be synthesized without using a surfactant, dimethyl formamide (DMF) or CO gas.

The present disclosure is directed to proving a method for preparing a carrier-octahedron structured platinum-nickel alloy nanoparticle complex.

The present disclosure is also directed to providing a carrier-octahedron structured platinum-nickel alloy nanoparticle complex prepared using the method for preparing a carrier-octahedron structured platinum-nickel alloy nanoparticle complex.

The present disclosure is also directed to providing a catalyst for a fuel cell cathode including the carrier-octahedron structured platinum-nickel alloy nanoparticle complex.

Hereinafter, the present specification will be described in more detail with reference to examples. However, the following examples are for illustrative purposes only, and are not to limit the present specification.

EXAMPLE

Preparation Example 1

After introducing 7.5 g of PEI, 1.8 g of nafion (5 wt % nafion solution) and 1.8 g of carbon to a mixed solution of 850 mL of isopropyl alcohol (IPA) and 450 mL of deionized water, the result was sufficiently stirred and then filtered to obtain carbon coated with PEI and nafion.

Example 1

After sufficiently dispersing 64.8 mg of the carbon coated with PEI and nafion of Preparation Example 1 into 25 mL of ethylene glycol, 66.9 mg of platinum(II) acetylacetonate ($Pt(acac)_2$), 43.7 mg of nickel(II) acetylacetonate ($Ni(acac)_2$) and 96.9 mg citric acid were added thereto, and the result was sufficiently stirred.

In order to remove water, the temperature was raised to 120° C. under vacuum, and the result was heated for 30 minutes, and after the temperature was raised to 200° C. under nitrogen atmosphere, the result was heated for 2 hours and 30 minutes. Herein, octahedron structured metal particles were formed during a synthesis process of raising the temperature from 120° C. to 200° C. and heating.

The result was cooled to room temperature, and then filtered using ethanol and distilled water. The filtered octahedron structured PtNi-carbon complex was dried in an oven, and placed in a 0.5 M sulfuric acid solution. The result was heated for 2 hours at 80° C., then cooled to room temperature, and filtered with sufficient distilled water to prepare a catalyst.

Example 2

After sufficiently dispersing 58.5 mg of the carbon coated with PEI and nafion of Preparation Example 1 into 30 mL of ethylene glycol, 78.7 mg of platinum(II) acetylacetonate ($Pt(acac)_2$), 51.4 mg of nickel(II) acetylacetonate ($Ni(acac)_2$) and 115.3 mg of citric acid were added thereto, and the result was sufficiently stirred.

In order to remove water, the temperature was raised to 120° C. under vacuum, and the result was heated for 30 minutes, and after the temperature was raised to 200° C. under nitrogen atmosphere, the result was heated for 2 hours and 30 minutes. Herein, octahedron structured metal particles were formed during a synthesis process of raising the temperature from 120° C. to 200° C. and heating.

The result was cooled to room temperature, and then filtered using ethanol and distilled water. The filtered octahedron structured PtNi-carbon complex was dried in an oven, and placed in a 0.5 M sulfuric acid solution. The result was heated for 2 hours at 80° C., then cooled to room temperature, and filtered with sufficient distilled water to prepare a catalyst.

Comparative Example 1

40 wt % Pt/C, a commercialized catalyst manufactured by Johnson Matthey, was used as a catalyst.

Comparative Example 2

A catalyst was prepared in the same manner as in Example except that carbon coated only with polyallylamine hydrochloride (PAH) was used instead of the carbon coated with PEI and nafion of Preparation Example 1. The catalyst is a PtNi-carbon complex having an octahedron structure on a carbon carrier coated only with PAH.

Comparative Example 3

A catalyst was prepared in the same manner as in Example 1 except that the acid treatment process was not performed.

The prepared catalysts had metal particles having an octahedron structure, however, the platinum content and the nickel content in the metal particles were different as in the ICP-OES analysis results of the following Table 1.

TABLE 1

|  | Content [wt %] | | Molar Ratio | |
| --- | --- | --- | --- | --- |
|  | Pt | Ni | Pt | Ni |
| Comparative Example 3 | 26.3 | 5.68 | 0.58 | 0.42 |
| Example 1 | 29.9 | 1.55 | 0.85 | 0.15 |

Comparative Example 4

A catalyst was prepared in the same manner as in Example 1 except that a carbon carrier without a polymer layer was used. The catalyst is a PtNi-carbon complex having an octahedron structure on a carbon carrier.

Test Example 1

Comparative Experiments on with/without Capping Agent Having Carboxyl Group

Test Example 1-1

Using Capping Agent Having Carboxyl Group

After sufficiently dispersing 49.7 mg of carbon into 25 mL of ethylene glycol, 66.9 mg of platinum(II) acetylacetonate ($Pt(acac)_2$), 31.4 mg of nickel(II) formate dihydrate ($Ni(HCO_2)_2 \cdot 2H_2O$) and 96.9 mg of citric acid were added thereto, and the result was sufficiently stirred.

In order to remove water, the temperature was raised to 120° C. under vacuum, and the result was heated for 30 minutes, and after the temperature was raised to 220° C. under nitrogen atmosphere, the result was heated for 2 hours and 30 minutes. Herein, octahedron structured metal particles were formed during a synthesis process of raising the temperature from 120° C. to 220° C. and heating.

The result was cooled to room temperature, and then filtered using ethanol and distilled water. The filtered octahedron structured PtNi-carbon complex was dried in an oven to prepare a catalyst.

The catalyst is a catalyst having platinum particles having an octahedron structure on a carbon carrier without a polymer layer.

Test Example 1-2

Not Using Capping Agent Having Carboxyl Group

A catalyst was prepared in the same manner as in Test Example 1-1 except that citric acid was not added.

Figure 9:
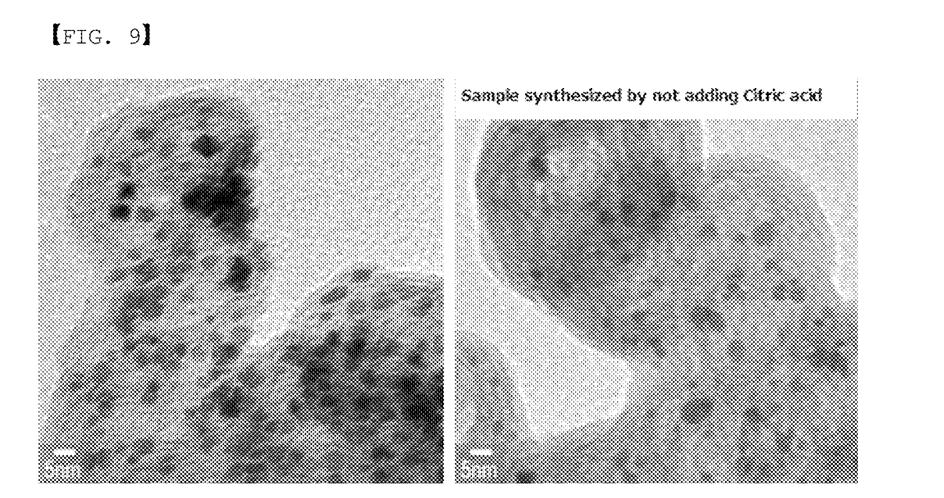
FIG. 9 shows transmission electron microscopy (TEM) images observing particle shapes depending on the presence of a capping agent having a carboxyl group of Test Example 1.

FIG. 9 shows transmission electron microscopy (TEM) images for the catalyst of Test Example 1-1 (left) and the catalyst of Test Example 1-2 (right). Herein, it was identified through the TEM image of FIG. 9 that the metal particles in the prepared catalyst did not have an octahedron structure.

As shown in the TEM picture, particle size uniformity was enhanced when adding citric acid compared to before the addition, and it was identified that citric acid provided help in forming the octahedron structure. In addition, it was predicted that, when adding citric acid, the pH of the reaction composition changed to an acidic condition, which helped dissolution of $Pt(acac)_2$, a precursor, enhancing particle size uniformity and the degree of dispersion.

Test Example 2

Effects of Metal Precursor Ligand Type

Test Example 2-1

Changing Platinum Precursor

Figure 10:
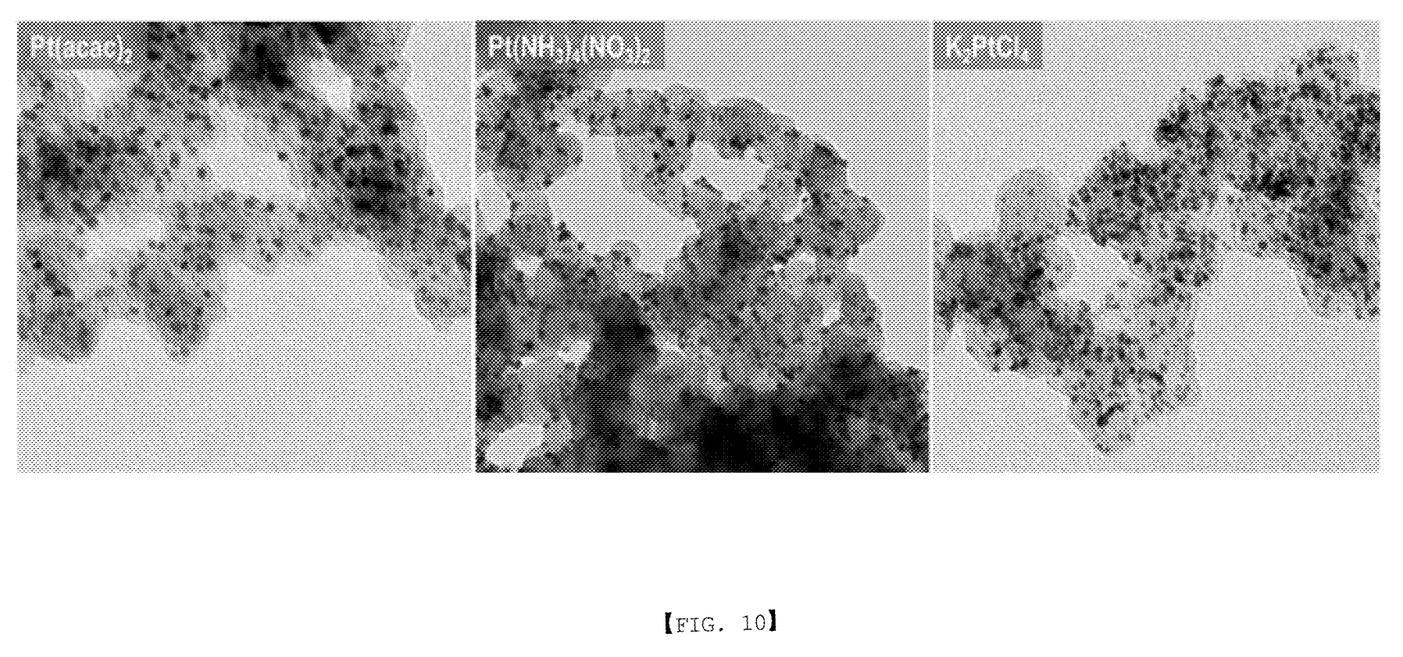
FIG. 10 shows transmission electron microscopy (TEM) images observing particle shapes depending on platinum precursor types of Test Example 2-1.

In order to examine effects of platinum precursor types on the particle shapes, a catalyst was prepared in the same manner as in Test Example 1-1 except that the platinum precursor type was used as in FIG. 10.

Through FIG. 10, it was identified that octahedron structured alloy nanoparticles were formed when using Pt(acac)$_2$.

Test Example 2-2

Changing Nickel Precursor

Figure 11:
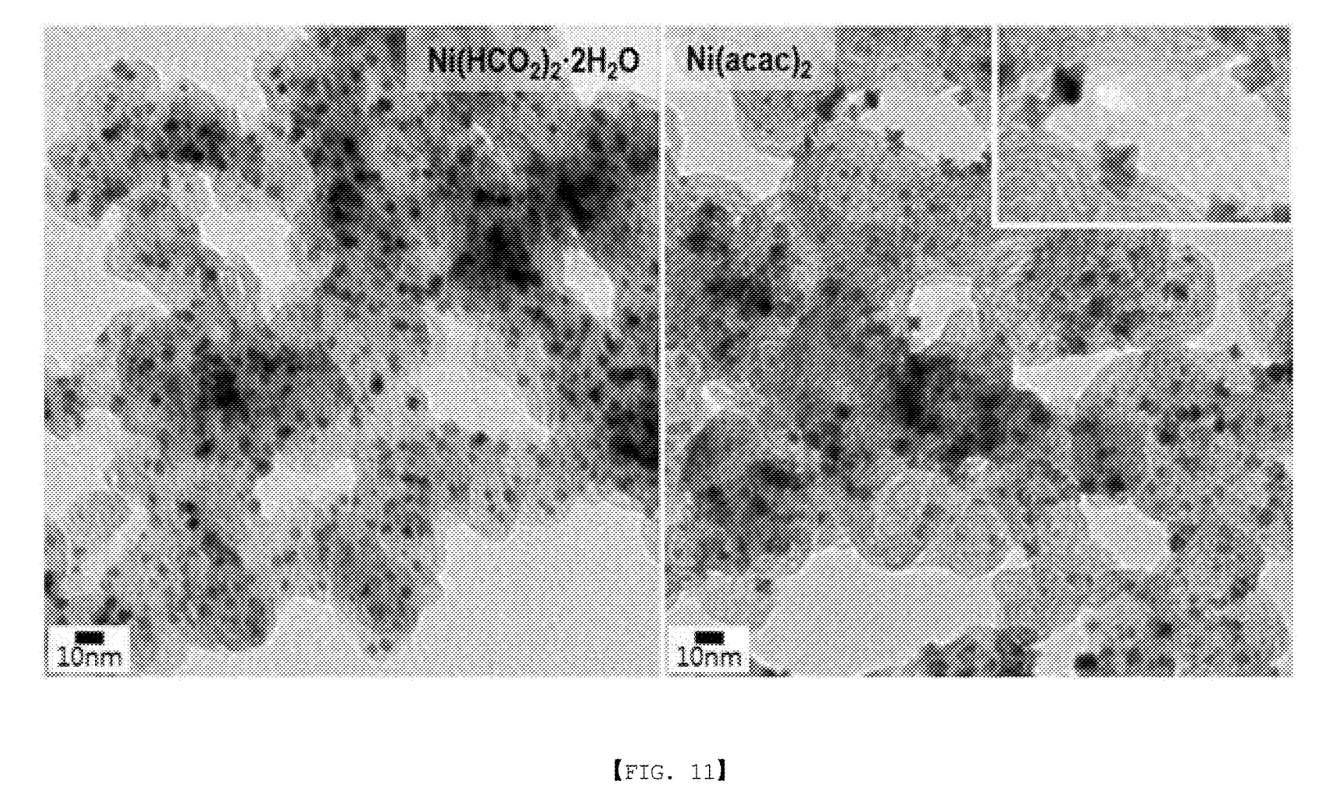
FIG. 11 shows transmission electron microscopy (TEM) images observing particle shapes depending on nickel precursor types of Test Example 2-2.

When preparing a catalyst in the same manner as in Test Example 1-1 except for using Ni(acac)$_2$ as the nickel precursor, it was identified that the edge part of the octahedron structure became clear (right picture) compared to the nanoparticles prepared in Test Example 1-1 (left picture) as in FIG. 11.

As a result, it was identified that a precursor ligand was capable of providing help in controlling an octahedron structure shape.

Test Example 3

Figure 5:
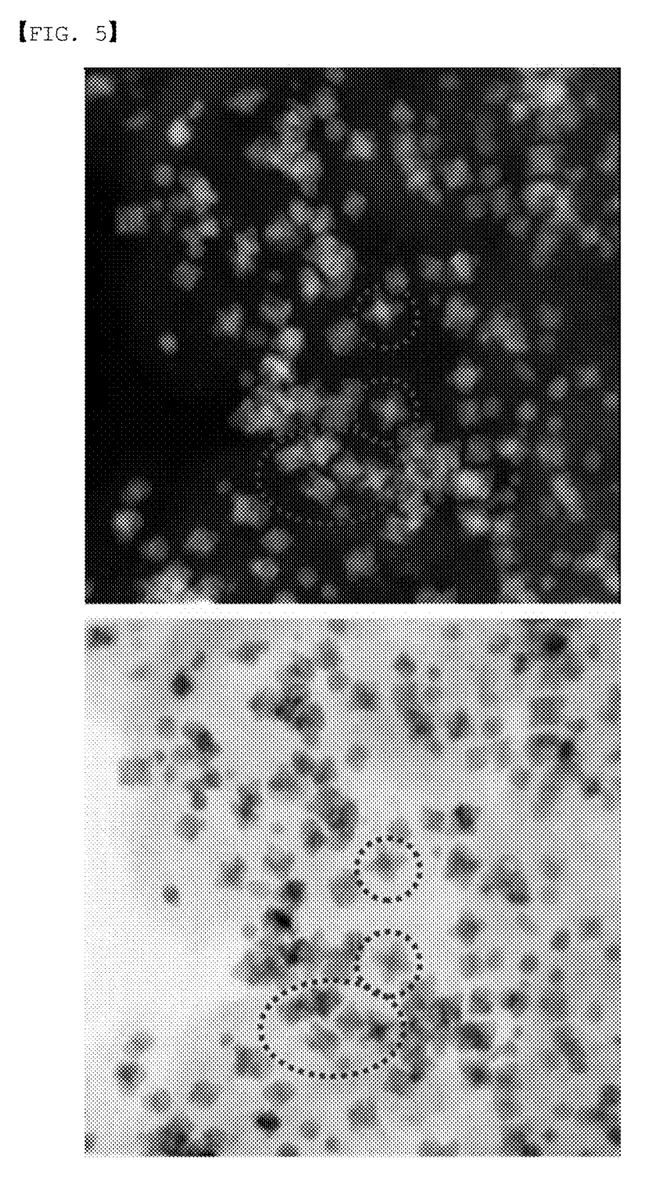
FIG. 5 shows an image photographed using high-resolution transmission electron microscopy (HRTEM) (left) and a high-angle annular dark-field scanning transmission electron microscopy (HADDF-STEM) image (right) for a catalyst prepared in Example 1.

For the catalyst prepared in Example 1, the image taken by high-resolution transmission electron microscopy (HR-TEM) (left) and the image taken by high-angle annular dark-field scanning transmission electron microscopy (HADDF-STEM) (right) are shown in FIG. 5.

Through FIG. 5, it was seen that the catalyst was a catalyst having particles having an octahedron structure shape.

Test Example 4

Figure 6:
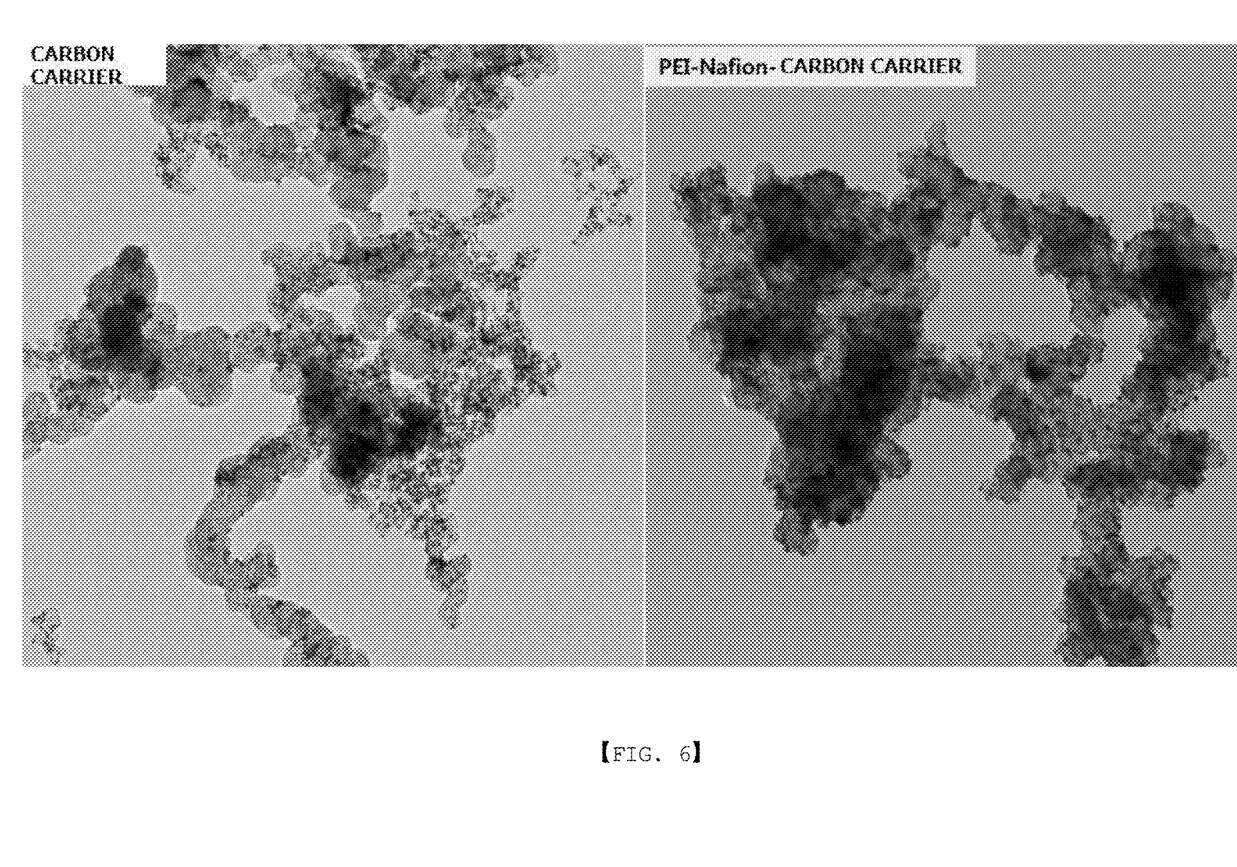
FIG. 6 shows transmission electron microscopy (TEM) images for a catalyst of Comparative Example 4 (left picture) and a catalyst of Example 1 (right picture).

Transmission electron microscopy (TEM) images for the catalyst of Comparative Example 4 (left picture) and the catalyst of Example 1 (right picture) are shown in FIG. 6.

Through FIG. 6, it was seen that, in the catalyst of Example 1, metal particles were supported on carbon coated with PEI and nafion, and the metal particles had favorable degree of dispersion.

Test Example 5

Evaluation on PEMFC Single Cell

Figure 7:
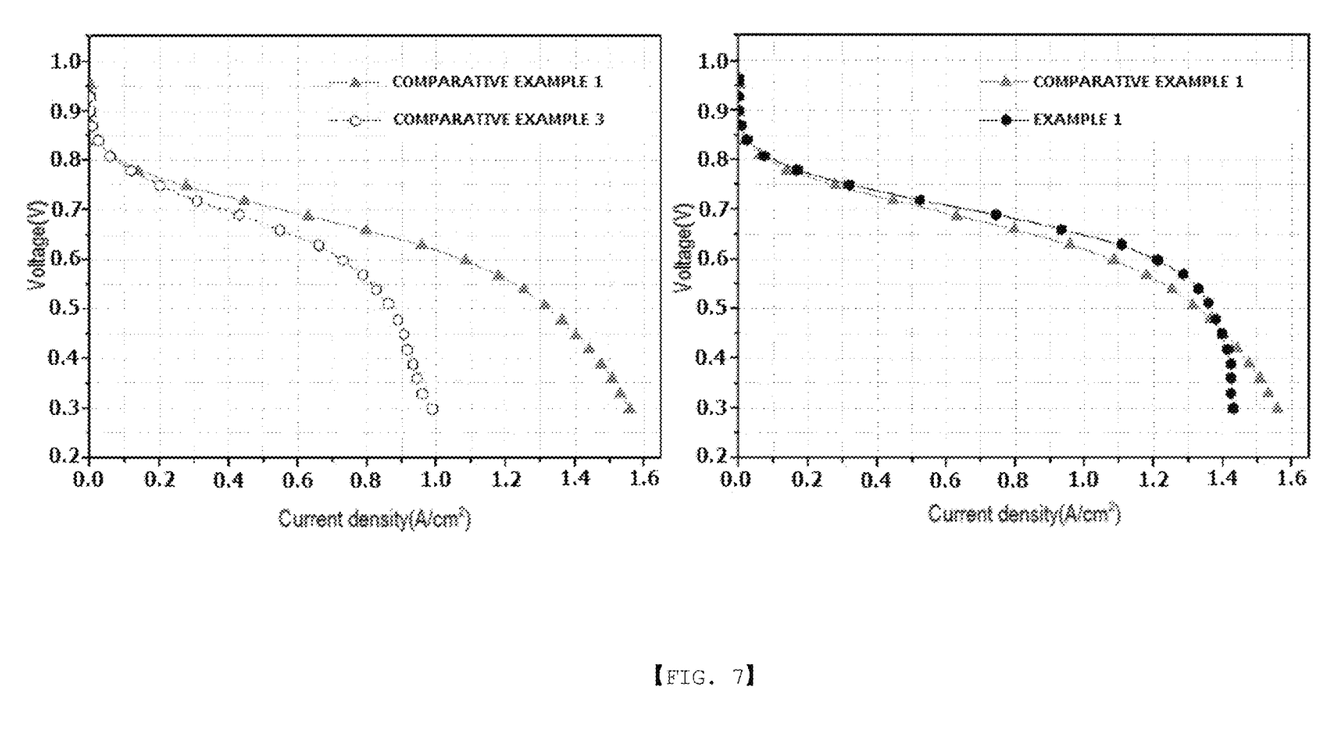
FIG. 7 and FIG. 8 are results evaluating performance of PEMFC single cells using each of catalysts of Examples 1 and 2 and Comparative Examples 1 to 3.
Figure 8:
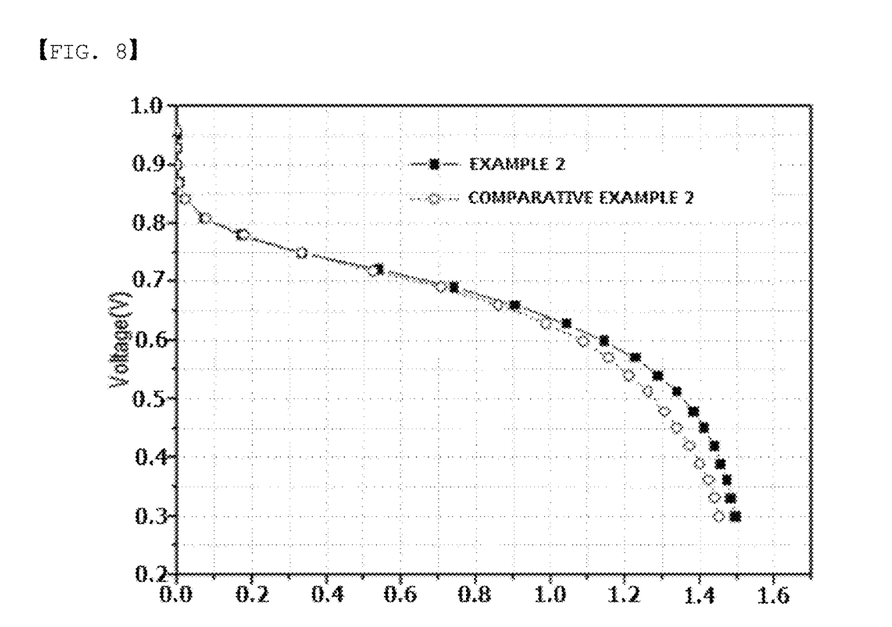

Results of evaluating performance of PEMFC single cells using each of the catalysts of Examples 1 and 2 and Comparative Examples 1 to 3 are shown in FIG. 7 and FIG. 8.

After introducing 30 mg of the catalyst of Comparative Example 1 to 1.8 mL isopropyl alcohol (IPA) and sufficiently stirring the result, 257 mg of nafion was added thereto, and an ink for a reduction electrode was prepared through ultrasonic waves. In addition, after introducing 30 mg of each of the catalysts of Examples 1 and 2 and Comparative Examples 2 and 3 to a mixed solution of 0.84 mL of isopropyl alcohol (IPA) and 0.66 mL of deionized water and sufficiently stirring the result, 257 mg of nafion was added thereto, and an ink for a reduction electrode was prepared through ultrasonic waves.

Herein, the reduction electrode loading amount was as follows.

Comparative Example 1: 0.4 mg$_{Pt}$/cm$^2$
Comparative Example 2: 0.23 mg$_{Pt}$/cm$^2$
Comparative Example 3: 0.22 mg$_{Pt}$/cm$^2$
Example 1: 0.20 mg$_{Pt}$/cm$^2$
Example 2: 0.25 mg$_{Pt}$/cm$^2$ After introducing 30 mg of a platinum catalyst to 1.8 mL of IPA and sufficiently stirring the result, 257 mg of nafion was added thereto, and an ink for an oxidation electrode was prepared through ultrasonic waves.

A MEA was prepared using the ink prepared above, and by using the MEA in a single cell, a performance evaluation was carried out under a condition of 80° C., 100% RH, H$_2$ (anode)/Air (cathode)=150/500 sccm.

Through FIG. 7, it was seen that, when comparing Comparative Example 3 and Example 1, the catalyst had enhanced open circuit voltage (OCV), Ohmic loss and mass transport section performance by removing nickel on the particle surface through the acid treatment process.

In addition, through the picture on the right of FIG. 7, it was seen that, when half (½) of platinum was loaded on the electrode compared to the commercialized catalyst (Comparative Example 1), more superior performance was obtained compared to Comparative Example 1 in a low current section and 0.6 V by the metal particles having an octahedron structure. Accordingly, it was identified that the catalyst of Example 1 was a platinum-reduced and highly active catalyst.

Through FIG. 8, it was identified that, compared to the catalyst of Comparative Example 2 treated only with polyallylamine hydrochloride (PAH), a cationic polymer, the catalyst of Example 2 treated with both PEI and nafion had enhanced performance in the material transfer section with enhanced performance in the hydrogen transfer section due to the addition of nafion.

The invention claimed is:

1. A method for preparing a catalyst for a fuel cell comprising:

forming a polymer layer having an amine group and a hydrogen ion exchange group represented by the following Chemical Formula 12 on a carbon carrier;

preparing a reaction composition by adding the polymer layer-formed carbon carrier, a first metal precursor, a second metal precursor and a capping agent having a carboxyl group to a solvent, and, using the reaction composition, preparing a carrier-nanoparticle complex having metal nanoparticles formed on the polymer layer of the carbon carrier; and acid treating the complex;

wherein the polymer layer includes polyalkyleneimine (PEI) having the amine group and a hydrogen ion exchange polymer having the hydrogen ion exchange group, or a polymer derived from polyalkyleneimine having the amine group and a hydrogen ion exchange polymer having the hydrogen ion exchange group, wherein the metal nanoparticles formed on the polymer layer of the carbon carrier include a first metal and a second metal, and further have an octahedron structure;

the first metal and the second metal are different from each other;

a molar ratio of the first metal and the second metal is from 0.8:0.2 to 0.9:0.1, wherein the first metal includes at least one of platinum (Pt), palladium (Pd), rhodium (Rh), iridium (Ir) and ruthenium (Ru), wherein the second metal includes at least one of nickel (Ni), osmium (Os), cobalt (Co), iron (Fe) and copper (Cu)

wherein Chemical Formula 12 is represented by the following:

—SO$_3^-$X    [Chemical Formula 12]

wherein, in Chemical Formula 12, X is a monovalent cation group; and wherein based on the total elements on the polymer layer surface, the content of the nitrogen element of the amine group is greater than or equal to 0.01% by weight and less than or equal to 5% by weight, and the content of the sulfur element of the hydrogen ion exchange group of Chemical Formula 12 is greater than or equal to 0.01% by weight and less than or equal to 1% by weight.

2. The method for preparing a catalyst for a fuel cell of claim 1, wherein the first metal precursor is at least one of platinum(II) acetylacetonate ($Pt(acac)_2$), palladium acetylacetonate ($Pd(acac)_2$), palladium acetate ($Pd(OAc)_2$), rhodium acetylacetonate ($Rh(acac)_2$), iridium acetylacetonate ($Ir(acac)_2$) and ruthenium acetylacetonate ($Ru(acac)_2$).

3. The method for preparing a catalyst for a fuel cell of claim 1, wherein the second metal precursor is one of nickel(II) acetylacetonate, nickel(II) formate dihydrate, nickel(II) acetate tetrahydrate, copper(II) acetylacetonate, copper(II) formate hydrate, copper(II) acetate, cobalt(II) acetylacetonate, cobalt(II) acetate tetrahydrate, cobalt(II) formate, iron(II) acetylacetonate and iron(II) acetate.

4. The method for preparing a catalyst for a fuel cell of claim 1, wherein an acid treatment solution of the acid treatment has a concentration of 2 M or less.

5. The method for preparing a catalyst for a fuel cell of claim 1, wherein an acid treatment time of the acid treatment is longer than or equal to 1 hour and shorter than or equal to 5 hours.

6. The method for preparing a catalyst for a fuel cell of claim 1, wherein the capping agent having a carboxyl group includes citric acid or a mixture of citric acid and sodium formate.

7. The method for preparing a catalyst for a fuel cell of claim 1, wherein, based on a total weight of the reaction composition, a content of the capping agent having a carboxyl group is greater than or equal to 0.1% by weight and less than or equal to 2% by weight.

8. The method for preparing a catalyst for a fuel cell of claim 1, wherein the reaction composition has a pH of 4 or lower.

9. The method for preparing a catalyst for a fuel cell of claim 1, wherein the forming of a polymer layer comprises forming the polymer layer by introducing the carbon carrier to a solution including polyalkyleneimine and a hydrogen ion exchange polymer, or a solution including a polymer derived from polyalkyleneimine having an amine group and a hydrogen ion exchange polymer having the hydrogen ion exchange group.

* * * * *